No. 822,518. PATENTED JUNE 5, 1906.
A. FRESCHL.
WHEEL.
APPLICATION FILED APR. 21, 1905.
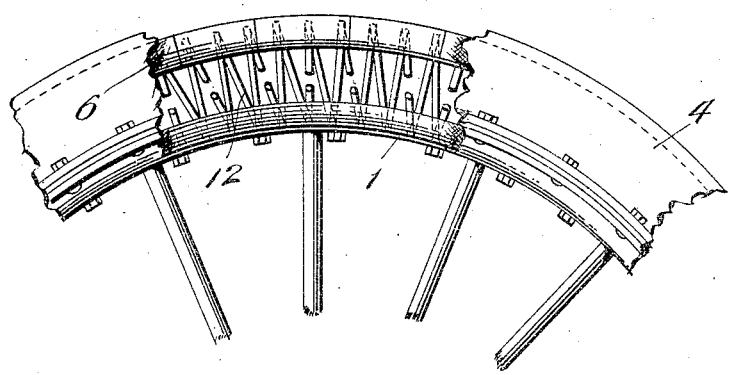
Fig. 1.
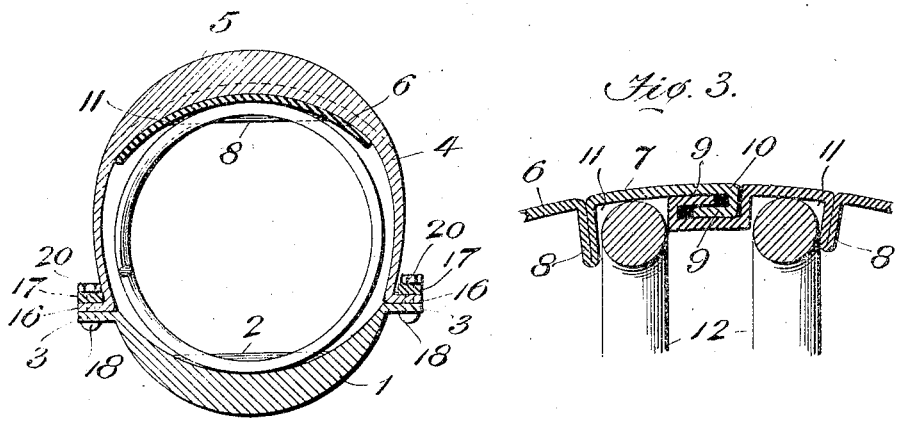
Fig. 2.
Fig. 3.
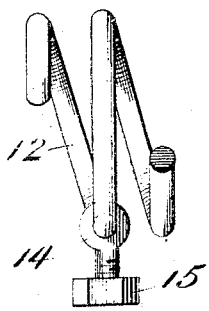
Fig. 4.
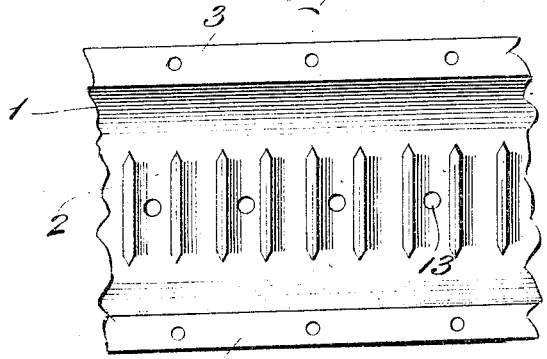
Fig. 5.
Witnesses:
C. F. Duvall
V. S. Beall
Inventor:
Alfred Freschl,
by W. Duvall
Attorney

UNITED STATES PATENT OFFICE.

ALFRED FRESCHL, OF CHICAGO, ILLINOIS.

WHEEL.

No. 822,518.   Specification of Letters Patent.   Patented June 5, 1906.

Application filed April 21, 1905. Serial No. 256,759.

*To all whom it may concern:*

Be it known that I, ALFRED FRESCHL, a citizen of the United States, residing at Chicago, in the county of Cook and State of Illinois, have invented an Improvement in Wheels, of which the following is a specification.

This invention relates to improvements in vehicle-wheels, and more especially to that class employed in automobiles and involving the use of springs within the tire-casing for yieldingly supporting the tire.

The objects of my invention are to construct a practical automobile-wheel which while having the necessary resiliency to absorb the usual shocks, and therefore lend the necessary ease in riding, yet cannot become disabled by reason of punctures.

A further object in view is to produce an outer metallic rim or tread for the springs, which rim or tread will yield to the circumferential expansion and contraction of the springs and which in connection with a somewhat similarly constructed wheel-rim will retain the said springs in their proper working and relative position.

Various other objects and advantages of the invention will hereinafter appear, and the novel features thereof will be particularly pointed out in the claims.

In the accompanying drawings, Figure 1 is an elevation of a portion of a wheel embodying my invention, a section of the outer casing being broken away to expose the interior. Fig. 2 is a cross-section thereof. Fig. 3, a portion of the wheel in longitudinal section, the parts being enlarged; Fig. 4, a detail of one of the spring-sections; Fig. 5, a plan of a portion of the rim of the wheel.

Like numerals of reference indicate like parts in all the views of the drawings.

The rim 1 of the wheel may be formed of any material—as, for instance, wood or metal, or a combination of both. The outer face of the same is circumferentially concaved and provided along its center and at intervals with recesses 2, extending transverse the same. Of course a strip of metal stamped to form these recesses may be secured within the rim, if desired. The edges of the rim are in the present instance formed with flanges 3, the same entering into the construction of fastener which I may, though not necessarily do, employ.

4 designates the outer casing or shoe, and the same may be formed of leather, rubber, or fabric, or a combination of any two or more materials. In the present instance I have shown it of leather, and the tread thereof may be increased in thickness by the addition of one or more leather layers or rubber, as indicated at 5, so as to compensate for the wear at this point. The tread having become worn by use it of course can be replaced, as is usual in tire construction.

Against the inner side of the tread of the tire, and therefore opposing the rim 1, I employ a metallic band 6, the same being segmental shape in cross-section and formed on the arc of a circle about corresponding with that of the tire. This band is preferably formed of sheet-steel of a proper thickness, and I prefer to construct the same so that it will have some flexibility. This I may secure in various ways, but prefer to construct the band for this purpose in a series of sections 7. Each section 7 has one or more transverse creases or kinks 8 and one member 9 or an interlocking slip-joint 10, so that when the sections are combined or connected they are capable of such movement as will render the band expansive. It will thus be seen that the transverse kinks 8 produce between themselves and the slip-joints 10 transverse grooves or pockets 11, which correspond to the transverse grooves or pockets 2, formed in the rim. In such grooves or pockets of the rim and the band are inserted the coils of several spring-sections 12. (See particularly Figs. 2 and 3.) The spring, as before indicated, consists of a series of sections 12, each section comprising a plurality of coils. For the purpose of preventing the coils or sections from having any tendency to become displaced in a circumferential direction I may provide the rim 1 with holes 13 opposite a coil of each spring-section and connect said coil with an eyebolt 14, the shank of which passes through the hole 13 of the rim and beyond the same is provided with a securing-nut, or I may prefer some other simple mode of fastening, if the same in practice is found necessary.

It will be noted that, as shown in Fig. 1, although the spring is formed in sections each independent of the other yet it is practically continuous, inasmuch as the terminals of each section are practically in line with those of the next adjacent sections. The object of this arrangement is that when the wheel meets with an obstruction only the section of spring at that point of the wheel is influenced—that is to say, the section thus influenced will yield in a circumferential direction only and not radially by a flattening out of its coils and imparting a strain to the entire spring, as heretofore in a continuous spring. This disposition is further enhanced by forming the metallic band 6 and the case of the rim 1 upon segments of a circle greater than the coils, so that the latter merely engage the rim and the band at diametrically opposite points, whereby their frictional contact with these two elements is decreased and the coils more liable to expand and contract in a circumferential direction. The metallic band being flexible will also partake of such expansion and contraction, such action, however, upon the part of the band being throughout the same, so that very slight play between the sections 7 is necessary to compensate for quite a degree of expansion and contraction on behalf of any one or more of the spring-sections.

Any ordinary means may be employed for securing the tire-casing upon the rim, and I do not confine myself to that shown. In the present instance, however, the edges of the tire overlap the flanges 3 of the rim, as indicated at 16, and over these edges perforated rings or bands 17 are mounted. Bolts 18 are passed through the flanges 3 and 16 and the rings or bands 17, and clamping-nuts 20 serve to retain the bolts in position.

Having described my invention, what I claim is—

1. The combination with a wheel provided with a rim having transverse recesses, of a band encircling the rim and having corresponding recesses and comprising sections having slip-joint interlocking connections, spring coiled-wire sections of less diameter than the band and rim and interposed between the rim and band and having their coils seated in the recesses, means for securing each section against circumferential movement, and an outer casing covering the band and secured to the rim.

2. The combination with a wheel having a rim provided with transverse recesses, of an outer band formed of a series of loosely-connected sections and provided with transverse recesses corresponding with those of the rim, a series of coiled-wire sections having their coils engaged by the recesses of the band and rim, and an outer casing or covering secured to the rim.

3. The combination with a wheel having a rim provided with transverse recesses, of a band consisting of a series of sections connected by interlocking slip-joints and having transverse recesses corresponding with those of the rim, a series of coiled-wire sections having their coils seated in the said recesses of the rim and band, and an outer casing or covering connected to the rim.

4. The combination with a wheel having a rim provided with transverse recesses and an outer concaved face, of a band segmental in cross-section and provided with transverse recesses agreeing with those of the rim, a coiled-wire support of less diameter than the band and rim and seated in the transverse recesses, whereby it contacts with the band and rim at diametrically opposite points only, and an outer casing or covering secured to the rim.

5. The combination with a wheel having a concaved rim, an outer band segmental in cross-section, interposed sections of coiled wire and of less diameter than the band and rim, means for securing said coiled-wire sections between the band and rim, and an outer casing or covering connected to the rim.

6. The combination with a wheel having a rim, of an outer band comprising sections each having a plurality of kinks 8 and terminating in slip-joint members 9 producing transverse recesses 11, coiled-wire sections 12 engaging the recesses 11, an outer covering or casing connected to the rim, and means carried by the rim for maintaining the coiled-wire sections in position.

7. The combination with a wheel having a segmental rim, a segmental outer flexible band, intermediate coils of diameters less than the band and rim, an outer casing secured to the rim, and means carried by the rim and band for retaining the coils in proper relative position and yet permitting of free circumferential contraction and expansion thereof.

In testimony whereof I have signed my name to this specification in the presence of two subscribing witnesses.

ALFRED FRESCHL.

Witnesses:
H. L. BEALL,
W. S. DUVALL.